Nov. 6, 1923.  
M. C. BLEST  
1,473,006  
BRAKE MECHANISM  
Filed Nov. 29, 1922

Patented Nov. 6, 1923.

1,473,006

UNITED STATES PATENT OFFICE.

MINOT C. BLEST, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

BRAKE MECHANISM.

Application filed November 29, 1922. Serial No. 603,931.

*To all whom it may concern:*

Be it known that I, MINOT C. BLEST, a citizen of the United States, residing in Bellevue, in the county of Allegheny and State of Pennsylvania, have invented certain new and useful Improvements in Brake Mechanism, of which the following is a specification.

This invention relates to railway truck brakes and has for an object the provision of means for supporting the brake and for maintaining the brake beams in such positions when the braking power is released, that the entire faces of the brake shoes will be substantially equidistant from the treads of the wheels, as well as for moving the brake parts to their released positions, when the braking power is released.

Another object of the invention is to provide resilient means associated with a brake rod or connecting member and adjacent or associated brake beams for leveling said beams and for moving them to their released positions.

Another object of the invention is to provide means for hanging a brake beam from a brake connecting member whereby said beam is maintained level.

Another object of the invention is to provide means slidably associated with a brake connecting rod or member, for holding adjacent or associated brake beams level.

A further object of the invention is to provide means for moving the adjacent or associated brake beams of a car brake to released positions, when the braking power is released, and for maintaining said beams level, such means comprising a flexible member loosely mounted on a brake connecting rod or member and connected with said beams.

These and other objects will be apparent from the following description:—

Figure 1:
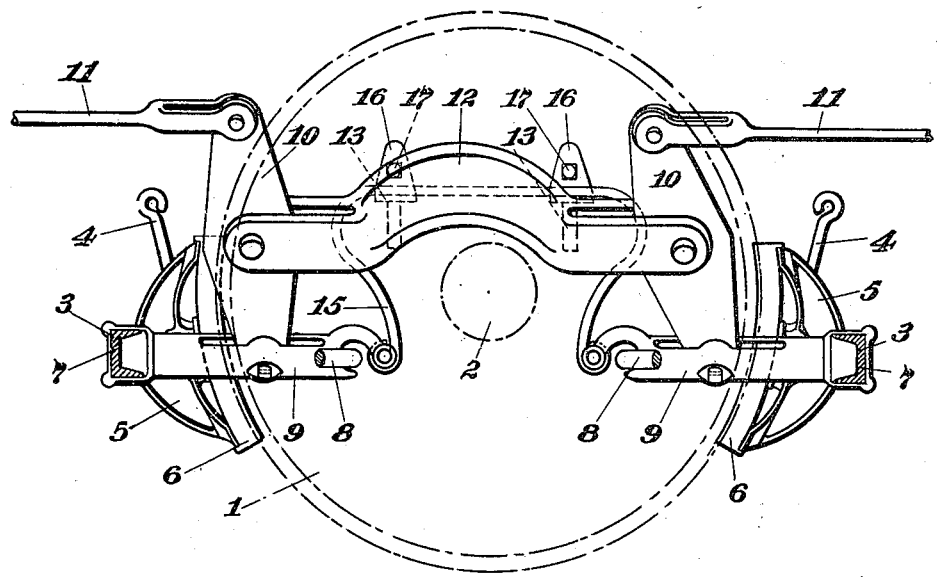
Figure 2:
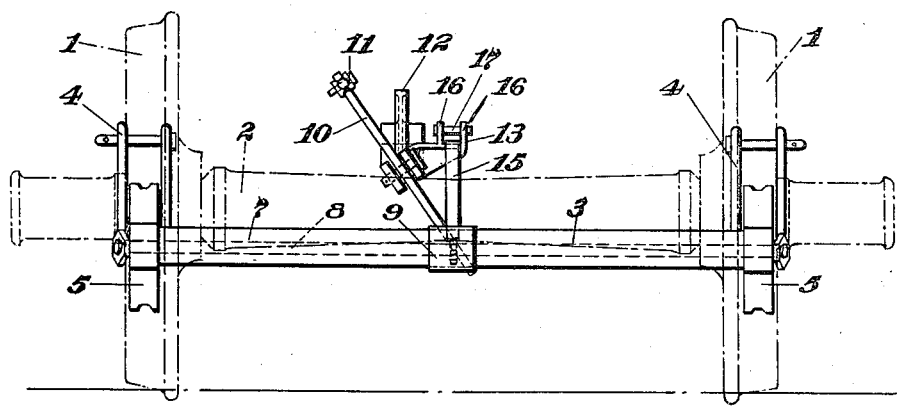

Referring to the drawing in which like reference characters refer to like part, Fig. 1 is a side elevational view of a portion of a brake mechanism embodying the invention, and Fig. 2 is an end elevational view of the same.

Referring now in detail to the drawing, the reference character 1 indicates a car truck wheel, and 2 the axle, which is mounted in the truck frame, (not shown), in the usual manner.

On each side of each pair of wheels, a brake beam 3 is provided, which extends transversely of the truck, preferably from wheel to wheel, and at its ends is preferably supported from the truck frame by hangers 4. Each of these beams is provided with heads 5, which in turn are provided with shoes 6, which shoes are adapted to engage the wheels 1, when the braking power is applied. These beams may be of any suitable type or construction, but as illustrated in the drawing, each preferably comprises a compression member 7, a tension member 8 and a strut or fulcrum 9, all suitably connected together in any preferred manner.

On each side of the axle 2, a lever 10 is provided, the lower end portion of which is connected with the strut 9, and the upper end portion is connected with a pull rod 11. Intermediate the pull rods 11, and struts 9, these levers are connected together by a connecting member 12, which may be in the form of a rod, and which, in the present embodiment of the invention, comprises a cast member, having spaced projections 13 formed thereon. These projections form supports, on which a brake beam leveling and releasing member 15 is seated, undue sidewise movement of the member being prevented by the spaced lugs 16, which are preferably integral with the projection 13, and undue vertical movement being prevented by a bolt or pin 17, which passes over the member 15, and through the lugs 16. Beyond the projections 13, this member is extended downwardly and each of its end portions is connected with the strut 9 of one of the brake beams 3. These downwardly extending portions are resilient and are adapted to maintain the beams level to move the brake beams to their released positions when the braking power is released. It will be noted that the member 15 is loosely mounted on the projections 13, for the purpose of permitting relative movement between the connecting member 12 and the member 15, so that the releasing movement of the brake beams will not be affected by the movement of the member 12.

It will be apparent to those skilled in the art to which this invention appertains, that changes may be made in the construction and arrangement of the several parts forming the invention, without departing from the spirit and scope of the appended claims.

Having thus described the invention, what I claim as new, and desire to secure by Letters Patent is:—

1. In a brake mechanism, a plurality of brake beams, a plurality of levers for operating said beams, a member connecting said levers, and means supported by said member for maintaining said beams level.

2. In a brake mechanism, a plurality of brake beams, mechanism for operating said beams, said mechanism comprising a brake rod, and means carried by said rod for holding said beams level.

3. In a brake mechanism, a brake beam, a brake rod, and means carried by said rod for maintaining said beam level.

4. In a brake mechanism, a plurality of brake beams, a plurality of levers for operating said beams, a member connecting said levers, and means carried by said member, for maintaining said beams level, and for moving said beams to released positions.

5. In a brake mechanism, a brake beam, a brake rod, and a resilient member carried by said rod and connected with said beam for supporting said beam level and for moving said beam to released position.

6. In a brake mechanism, a plurality of levers, a plurality of brake beams connected with said levers, a member connecting said levers, and means loosely mounted on said member and connected with said beams, adapted to maintain said beams level.

7. In a brake mechanism, brake levers, brake beams connected with said levers, a member connecting said levers, said member having a projection, and means mounted on said projection, and connected with said beams adapted to maintain said beams level.

8. In a brake mechanism, a plurality of brake levers, a member connecting said levers, brake beams connected with said levers, and means carried by said member adapted to move said beams to released positions.

9. In a brake mechanism, brake beams, brake levers connected with said beams, a member connecting said levers, and a brake beam leveling and releasing member loosely mounted on the first mentioned number.

10. In a brake mechanism, brake beams, brake levers connected with said beams, a member connecting said levers and brake beam supporting means carried by said member.

11. In a brake mechanism, the combination with a plurality of brake beams, of levers for operating said beams, a member connecting said levers, and a resilient member carried by said connecting member and connected with said beams for moving said beams to released positions and for maintaining them level.

12. In a brake mechanism, the combination with a brake beam, of a lever for operating said beam, a member for operating said lever, and means carried by said member for moving said beam to released position.

In testimony whereof I affix my signature in the presence of two witnesses.

MINOT C. BLEST.

Witnesses:
KATHLEEN KLEBER,
HEPBURN E. ANDERSON.